(12) United States Patent
Huang et al.

(10) Patent No.: US 8,635,656 B2
(45) Date of Patent: Jan. 21, 2014

(54) REAL-TIME VIDEO TRANSMISSION SYSTEM AND METHOD

(75) Inventors: Wei-Cheng Huang, New Taipei (TW); Mei-Yi Tsai, New Taipei (TW); Chien-Yu Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 101 days.

(21) Appl. No.: 13/267,889

(22) Filed: Oct. 7, 2011

(65) Prior Publication Data

US 2013/0014187 A1    Jan. 10, 2013

(30) Foreign Application Priority Data

Jul. 7, 2011    (TW) .............................. 100124074 A

(51) Int. Cl.
| | |
|---|---|
| *H04N 5/76* | (2006.01) |
| *H04N 7/173* | (2011.01) |
| *H04N 5/77* | (2006.01) |
| *G06F 9/38* | (2006.01) |
| *G06F 9/30* | (2006.01) |
| *H04N 5/907* | (2006.01) |

(52) U.S. Cl.
CPC ........ *H04N 7/17318* (2013.01); *G06F 9/30036* (2013.01); *H04N 5/772* (2013.01); *H04N 5/907* (2013.01); *G06F 9/3867* (2013.01); *H04N 7/17336* (2013.01)

USPC .......................... 725/93; 348/231.99; 712/200

(58) Field of Classification Search
USPC ............................................... 348/14; 725/93
See application file for complete search history.

(56) References Cited

U.S. PATENT DOCUMENTS

| | | | |
|---|---|---|---|
| 2004/0218068 A1* | 11/2004 | Bodin et al. ............. | 348/231.99 |
| 2009/0204790 A1* | 8/2009 | Khan ............................ | 712/200 |
| 2010/0231754 A1* | 9/2010 | Wang et al. .............. | 348/231.99 |

\* cited by examiner

*Primary Examiner* — Nasser Goodarzi
*Assistant Examiner* — Michael B Pierorazio
(74) *Attorney, Agent, or Firm* — CKC & Partners Co., Ltd.

(57) ABSTRACT

A real-time video transmission system includes a wireless video input device, a wireless data transmission interface and a computer. The computer includes a virtual camera module, a data management module and an application module. The data management module repeatedly accesses a register. The virtual camera module writes a received real-time video request into the register. When the data management module obtains the real-time video request from the register during accessing of the same, the wireless video input device is driven to film and send back a real-time video stream. The data management module writes the received real-time video stream into the register. When the received real-time video stream is obtained from the register during accessing of the same, the virtual camera module transmits the real-time video stream to the application program module.

12 Claims, 2 Drawing Sheets

REAL-TIME VIDEO TRANSMISSION SYSTEM AND METHOD

RELATED APPLICATIONS

This application claims priority to Taiwan Application Serial Number 100124074, filed Jul. 7, 2011, which is herein incorporated by reference.

BACKGROUND

1. Technical Field

The present invention relates to a video transmission system and method. More particularly, the present invention relates to a real-time video transmission system and method.

2. Description of Related Art

A wireless network refers to any type of computer network that is wireless, and is commonly associated with a telecommunications network whose interconnections between nodes is implemented without the use of wires. Wireless telecommunications networks are generally implemented with some type of remote information transmission system that uses electromagnetic waves, such as radio waves, for the carrier and this implementation usually takes place at the physical level or "layer" of the network. Common wireless telecommunications networks include CDMA2000®, general packet radio service (GPRS), global system for mobile communications (GSM®), Universal Mobile Telecommunications System (UTMS), Wi-Fi®, Worldwide Interoperability for Microwave Access (WiMax), etc.

Since a network service can be obtained through a wireless network without a network cable connected, wireless network services are becoming more and more popular. In addition, as transmission rates of wireless networks develop, more and more devices, such as computers, Personal Digital Assistants (PDAs), and Digital Photo Frames (DPFs) are using wireless networks for network connection. Therefore, there is a trend to transmit data through wireless networks.

Webcams are connected to computers through wired interfaces, such as Universal Serial Bus (USB®). Limited by transmission wires, users can only utilize web cams near their computers. However, it may be desirable for users to utilize webcams at a distance from their computers, especially when video chatting through instant Messaging (IM) programs.

SUMMARY

According to one embodiment of this invention, a real-time video transmission system is provided to write a real-time video stream, which is filmed by a wireless video input device, into a register and to drive a virtual camera module to obtain the real-time video stream from the register and provides the real-time video stream to an application program. The real-time video transmission system includes a wireless video input device, a wireless data transmission interface and a computer. The computer includes a virtual camera module, a data management module and an application program module. The virtual camera module includes a register for video and control data. The data management module builds a connection with the wireless video input device through the wireless data transmission interface and repeatedly accesses the register for video and control data. When a real-time video request is received, the application program module transmits the real-time video request to the virtual camera module. When the virtual camera module receives the real-time video request, the virtual camera module writes the real-time video request into the register for video and control data and accesses the register for video and control data repeatedly. When the data management module obtains the real-time video request from the register for video and control data during accessing of the same, the data management module drives the wireless video input device to film and send back a real-time video stream. The data management module writes the received real-time video stream into the register for video and control data. When the virtual camera module obtains the received real-time video stream from the register for video and control data during accessing of the same, the virtual camera module transmits the real-time video stream to the application program module.

According to another embodiment of this invention, a real-time video transmission method is provided for a computer. The computer includes a register for video and control data, a data management module, a virtual camera module and an application program module. In the method, a real-time video stream, which is filmed by a wireless video input device, is written into a register and the virtual camera module obtains the real-time video stream from the register and provides the real-time video stream to an application program. In the method, the data management module repeatedly accesses the register for video and control data. When the virtual camera module receives a real-time video request, the virtual camera module writes the real-time video request into the register for video and control data and repeatedly accesses the register for video and control data. When the data management module obtains the real-time video request from the register for video and control data during accessing of the same, the data management module drives a wireless video input device to film a real-time video stream and to transmit the real-time video stream to the data management module through a wireless data transmission interface. The data management module writes the received real-time video stream into the register for video and control data. When the virtual camera module obtains the received real-time video stream from the register for video and control data during accessing of the same, the virtual camera module transmits the real-time video stream to the application program module.

The present invention can achieve many advantages. A real-time video stream can be provided to application programs without the need for a physical camera disposed on the computer. In addition, since the wireless video input device transmits data wirelessly without a physical wire, users are not limited by a wired connection.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
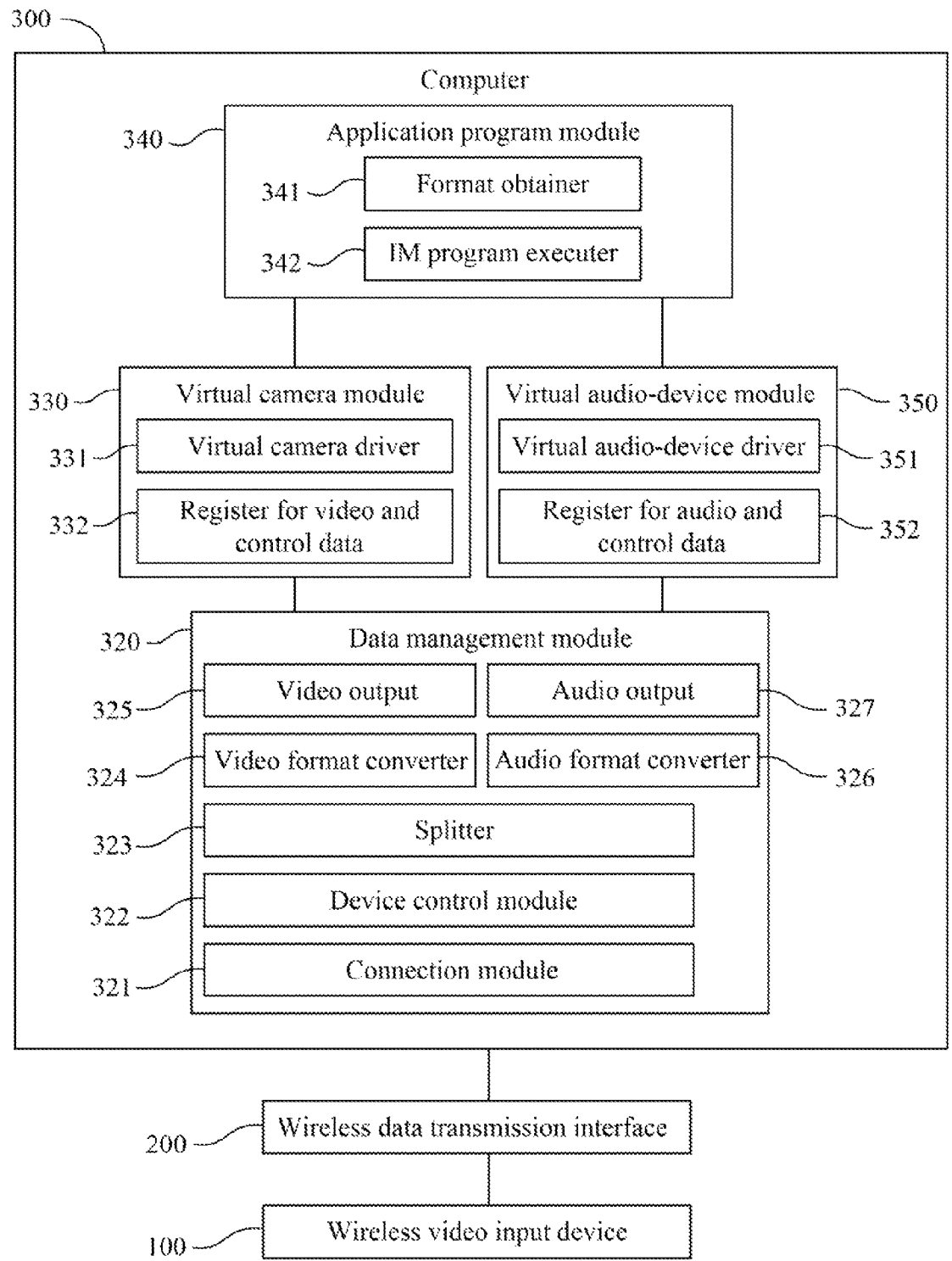
FIG. 1 is a block diagram of a real-time video transmission system according to an embodiment of this invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a block diagram will be described that illustrates a real-time video transmission system according to an embodiment of this invention. In the real-time video transmission system, a real-time video stream, which is filmed by a wireless video input device, is written into a register and a virtual camera module obtains the real-time video stream from the register and provides the real-time video stream to an application program.

The real-time video transmission system includes a wireless video input device 100, a wireless data transmission interface 200 and a computer 300. The wireless data transmission interface 200 may follow WiFi®, IEEE 802.11 series or any other wireless data transmission protocol to transmit data wirelessly. In some embodiments, the wireless video input device 100 may be a camera with a wireless transmission function, a video camera with a wireless transmission function or any other video input device with a wireless transmission function.

The computer 300 includes a data management module 320, a virtual camera module 330 and an application program module 340. The virtual camera module 330 includes a register for video and control data 332. The virtual camera module 330 can be implemented under a user mode or a kernel mode of an operating system (OS) executed by the computer 300. If the virtual camera module 330 is implemented under the user mode, the register for video and control data 332 can be implemented utilizing a dynamic-link library (DLL). If the virtual camera module 330 is implemented under the kernel mode, the register for video and control data 332 can be implemented utilizing a pipeline method or a file mapping method.

A connection module 321 of the data management module 320 builds a connection with the wireless video input device 100 through the wireless data transmission interface 200. The data management module 320 repeatedly accesses the register for video and control data 332. In some embodiments, when the data management module 320 repeatedly accesses the register for video and control data 332, the data management module 320 may repeatedly determine if there is an instruction, which is related to the wireless video input device 100, stored in the register for video and control data 332. The instruction related to the wireless video input device 100 may be a video request to the wireless video input device 100, a request for a supported format of the wireless video input device 100 or any other instruction related to the wireless video input device 100. The virtual camera module 330 is utilized to simulate a physical camera. In some embodiments, the virtual camera module 330 can be implemented utilizing DirectShow® or any other interface for designing application programs.

Hence, when the application program module 340 receives a real-time video request, the application program module 340 treats the virtual camera module 330 as a physical camera physically disposed on the computer 100, such that the application program module 340 transmits the real-time video request to the virtual camera module 330. When a real-time video request is received, a virtual camera driver 331 of the virtual camera module 330 writes the received real-time video request into the register for video and control data 332, and starts to access the register for video and control data 332 repeatedly. In some embodiments, when the virtual camera module 330 accesses the register for video and control data 332 repeatedly, the virtual camera driver 331 may determine if there is a real-time video stream stored in the register for video and control data 332.

When the data management module 320 obtains the real-time video request from the register for video and control data 332 during repeated accessing of the same, a device control module 322 of the data management module 320 drives the wireless video input device 100 to film and send back a real-time video stream. A video output 325 of the data management module 320 writes the received real-time video stream into the register for video and control data 332.

Hence, when the virtual camera module 330 obtains the received real-time video stream from the register for video and control data 322 during repeated accessing of the same, the virtual camera driver 331 of the virtual camera module 330 transmits the real-time video stream to the application program module 340. Therefore, the wireless video input device 100 can film a real-time video stream to provide to the application program module 340 without the need for a physical camera disposed on the computer 300. In addition, since the wireless video input device 100 transmits data wirelessly without a physical wire, users are not limited by a wired connection.

The format requested by the real-time video request can be set according to the supported format of the wireless video input device 100. Hence, the application program module 340 may include a format obtainer 341. When the format obtainer 341 receives a supported-format request, the format obtainer 341 transmits the supported-format request to the virtual camera module 330. In some embodiments, the application program module 340 may generate the supported-format request before transmitting the real-time video request. In some other embodiments, the supported-format request may be generated when the data management module 320 builds a connection with the wireless video input device 100. When the virtual camera module 330 receives the supported-format request, the virtual camera module 330 writes the supported-format request into the register for video and control data 332 and starts to repeatedly access the register for video and control data 332. When the data management module 320 obtains the supported-format request from the register for video and control data 332 during repeated accessing of the same, the data management module 320 obtains supported format information of the wireless video input device 100 to write into the register for video and control data 332. When the virtual camera module 330 obtains the supported format information from the register for video and control data 332 during repeated accessing of the same, the virtual camera module 330 transmits the supported format information to the application program module 340. Hence, the application program module 340 can set a requested video format of the real-time video request according to the supported format information. Subsequently, a video format converter 324 of the data management module 320 may conduct format conversion with respect to the real-time video stream according to the requested video format of the real-time video request.

The system may also obtain audio data utilizing the wireless video input device 100. Hence, the computer 300 may further include a virtual audio-device module 350. The virtual audio-device module 350 simulates a physical audio device physically disposed on the computer 100, such as a microphone, a sound card or any other audio device. When the data management module 320 receives a real-time audio stream generated by the wireless video input device 100 from the wireless video input device 100, the data management module 320 outputs the real-time audio stream to a register for audio and control data 352 of the virtual audio-device module

350. In some embodiments, the real-time video request may include a real-time audio request to drive the wireless video input device 100 to start to capture and obtain a real-time audio stream. The wireless video input device 100 may further include an audio capturing unit (such as a microphone or any type of audio capturing unit) to capture and generate a real-time audio stream. Furthermore, if the stream transmitted by the wireless video input device 100 is a real-time multimedia stream, a splitter 323 of the data management module 320 may split the received real-time multimedia stream into a real-time video stream and a real-time audio stream for respectively providing to the register for video and control data 322 and the register for audio and control data 352. A virtual audio-device driver 351 of the virtual audio-device module 350 outputs the real-time audio stream to the application program module 340. Subsequently, the application program module 340 may retrieve a real-time video stream and a real-time audio stream. In addition, an audio format converter 326 of the data management module 320 may conduct format conversion with respect to the real-time audio stream according to a requested audio format of the real-time audio request.

The application program module 340 may utilize the received real-time video stream for different application programs. In one embodiment of this invention, the application program module 340 may include an instant messaging (IM) program executer 342 for executing an IM program. Hence, the IM program executer 342 may forward the real-time video stream through the IM program. Subsequently, the real-time video stream, which is forwarded by the IM program, can be used for wireless video conferences, wireless security systems or any other video application. In other embodiments, the application program module 340 may execute other application programs to utilize the received real-time video stream, which should not be limited in this disclosure.

Figure 2:
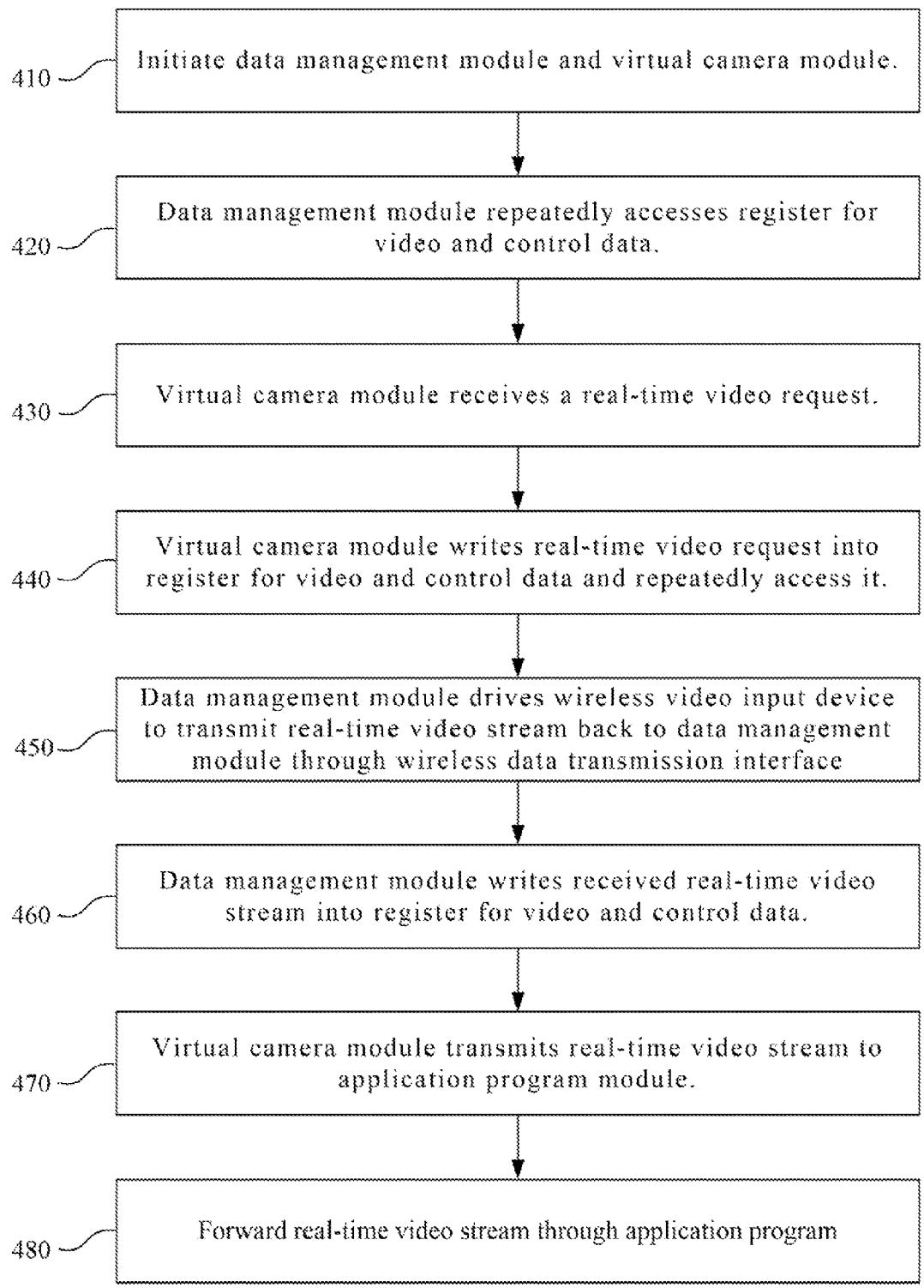
FIG. 2 is a flow diagram of a real-time video transmission method according to one embodiment of this invention.

Referring to FIG. 2, a flow diagram will be described that illustrates a real-time video transmission method according to one embodiment of this invention. In the method, a real-time video stream, which is filmed by a wireless video input device, is written into a register, and a virtual camera module obtains the real-time video stream from the register and provides the real-time video stream to an application program. The real-time video transmission method may take the form of a computer program product stored on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as static random access memory (SRAM), dynamic random access memory (DRAM), and double data rate random access memory (DDR-RAM); optical storage devices such as compact disc read only memories (CD-ROMs) and digital versatile disc read only memories (DVD-ROMs); and magnetic storage devices such as hard disk drives (HDD) and floppy disk drives.

The real-time video transmission method may be implemented by a computer, such as the computer 300 shown in FIG. 1. The computer includes a register for video and control data, a data management module, a virtual camera module and an application program module. The virtual camera module is utilized to simulate a physical camera. In some embodiments, the virtual camera module can be implemented utilizing DirectShow® or any other interface for designing application programs. The virtual camera module can be implemented under a user mode or a kernel mode of an OS executed by the computer. If the virtual camera module is implemented under the user mode, the register for video and control data can be implemented utilizing a DLL. If the virtual camera module is implemented under the kernel mode, the register for video and control data can be implemented utilizing a pipeline method or a file mapping method.

The routine 400 may begin at operation 410, where the data management module and the virtual camera module may be initiated.

The routine 400 continues to operation 420, where the data management module of the computer repeatedly accesses the register for video and control data. In some embodiments, the data management module may build a connection with the wireless video input device through a wireless data transmission interface. The wireless video input device may be a camera with a wireless transmission function, a video camera with a wireless transmission function or any other video input device with a wireless transmission function. In addition, when operation 420 is executed, that is, when the data management module repeatedly accesses the register for video and control data, there may be a repeated determination as to whether there is an instruction related to the wireless video input device stored in the register for video and control data. The above-mentioned instruction related to the wireless video input device may be a video request to the wireless video input device, a request for a supported format of the wireless video input device or any other instruction related to the wireless video input device.

After the virtual camera module receives a real-time video request at operation 430, the routine 400 continues to operation 440, where the virtual camera module writes the real-time video request into the register for video and control data and repeatedly accesses the register for video and control data. In some embodiments, when the virtual camera module accesses the register for video and control data repeatedly, a repeated determination may be made as to whether there is a real-time video stream stored in the register for video and control data.

In a state where the data management module obtains the real-time video request from the register for video and control data during accessing of operation 420, the routine 400 continues to operation 450, where the data management module drives a wireless video input device to transmit a real-time video stream back to the data management module through a wireless data transmission interface. In some embodiments, if the wireless video input device is a camera or a video camera with a wireless data transmission function, the data management module may drive the wireless video input device to start to film the real-time video stream for transmission at operation 450.

From operation 450, the routine 400 continues to operation 460, where the data management module writes the received real-time video stream into the register for video and control data. In some embodiments, if the virtual camera module is implemented under the kernel mode, the data management module writes the real-time video stream into the register for video and control data utilizing a pipeline method or a file mapping method at operation 460. In some other embodiments, if the virtual camera module is implemented under the user mode, the data management module writes the real-time video stream into the register for video and control data utilizing a DLL at operation 460.

In a state where the virtual camera module obtains the received real-time video stream from the register for video and control data during accessing at operation 440, the routine 400 continues to operation 470, where the virtual camera module transmits the real-time video stream to the application program module. Therefore, a real-time video stream can be provided to the application program module without the need for a physical camera disposed on the computer. In addition, since the wireless video input device transmits data wirelessly without a physical wire, users are not limited by a wired connection.

The application program module may utilize the received real-time video stream for different application programs. In one embodiment of this invention, the application program module may execute an IM program. Hence, the real-time video stream may be forwarded through an application program (such as an IM program) at operation 480. Subsequently, the real-time video stream, which is forwarded by the IM program, can be used for wireless video conferences, wireless security systems or any other video application. In other embodiments, the application program module may execute other application programs to utilize the received real-time video stream for other applications, which should not be limited in this disclosure.

In addition, the format requested by the real-time video request can be set according to the supported format of the wireless video input device. Hence, in one embodiment of this invention, the routine 400 may further include operations in which, when the virtual camera module receives a supported-format request, the virtual camera module writes the supported-format request into the register for video and control data and accesses the register for video and control data repeatedly. When the data management module obtains the supported-format request from the register for video and control data during accessing of the same, the data management module obtains supported format information of the wireless video input device to write into the register for video and control data. When the virtual camera module obtains the supported format information from the register for video and control data during accessing of the same, the virtual camera module transmits the supported format information to the application program module. Hence, the application program module can set a requested video format of the real-time video request according to the supported format information.

Furthermore, the wireless video input device may be utilized to capture an audio stream. Hence, the computer may further include an audio input interface and a virtual audio-device module. The virtual audio-device module simulates a physical audio device physically disposed on the computer, such as a microphone, a sound card or any other audio device. The routine 400 may further include operations in which, when the data management module receives a real-time audio stream generated by the wireless video input device from the wireless video input device, the data management module outputs the real-time audio stream to the virtual audio-device module. In some embodiments, the real-time video request may include a real-time audio request to drive the wireless video input device to start to capture and obtain a real-time audio stream. Furthermore, if the stream transmitted by the wireless video input device is a real-time multimedia stream, the data management module may split the received real-time multimedia stream into a real-time video stream and a real-time audio stream for respectively providing to the register for video and control data and a register for audio and control data of the virtual audio-device module. Hence, the application module may retrieve a real-time video stream and a real-time audio stream for application programs.

The present invention can achieve many advantages. A real-time video stream can be provided to application programs without the need for a physical camera disposed on the computer. In addition, since the wireless video input device transmits data wirelessly without a physical wire, users are not limited by a wired connection.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A real-time video transmission system comprising:
a wireless video input device;
a wireless data transmission interface; and
a computer comprising:
a virtual camera module comprising a register for video and control data;
a data management module for building a connection with the wireless video input device through the wireless data transmission interface and repeatedly accessing the register for video and control data to determine if there is an instruction, which is related to the wireless video input device, stored in the register for video and control data; and
an application program module, wherein when a real-time video request is received, the application program module transmits the real-time video request to the virtual camera module,
wherein when the virtual camera module receives the real-time video request, the virtual camera module writes the real-time video request into the register for video and control data and starts to access the register for video and control data repeatedly to determine if there is a real-time video stream stored in the register for video and control data,
wherein in response to determination that there is the real-time video request, which is taken as an instruction related to the wireless video input device, stored in the register for video and control data, the data management module obtains the real-time video request from the register for video and control data,
when the data management module obtains the real-time video request from the register for video and control data during accessing of the same, the data management module drives the wireless video input device to film and send back a real-time video stream,
the data management module writes the received real-time video stream into the register for video and control data,
wherein in response to determination that there is the received real-time video stream stored in the register for video and control data, the virtual camera module obtains the received real-time video stream from the register for video and control data,
when the virtual camera module obtains the received real-time video stream from the register for video and control data during accessing of the same, the virtual camera module transmits the real-time video stream to the application program module.

2. The real-time video transmission system of claim 1, wherein the application program module comprises:

a format obtainer, wherein when the format obtainer receives a supported-format request, the format obtainer transmits the supported-format request to the virtual camera module, wherein when the virtual camera module receives the supported-format request, the virtual camera module writes the supported-format request into the register for video and control data, when the data management module obtains the supported-format request from the register for video and control data during accessing of the same, the data management module obtains supported format information of the wireless video input device to write into the register for video and control data, when the virtual camera module obtains the supported format information from the register for video and control data during accessing of the same, the virtual camera module transmits the supported format information to the application program module, the application program module sets a requested video format of the real-time video request according to the supported format information.

3. The real-time video transmission system of claim 1, wherein the computer further comprises:

a virtual audio-device module comprising:
  a virtual audio-device driver; and
  a register for audio and control data,
wherein when the data management module receives a real-time audio stream generated by the wireless video input device less video input device, the data management module outputs the real-time audio stream to the register for audio and control data of the virtual audio-device module,
the virtual audio-device driver of the virtual audio-device module outputs the real-time audio stream stored in the register for audio and control data to the application program module.

4. The real-time video transmission system of claim 1, wherein the application program module comprises:
an instant messaging (IM) program executer for executing an IM program and forwarding the real-time video stream through the IM program.

5. The real-time video transmission system of claim 1, wherein the virtual camera module is implemented under a user mode or a kernel mode of an operating system (OS) executed by the computer.

6. A real-time video transmission method for a computer, wherein the computer comprises a register for video and control data, a data management module, a virtual camera module and an application program module, the real-time video transmission method comprises:

repeatedly accessing the register for video and control data utilizing the data management module to determine if there is an instruction, which is related to a wireless video input device, stored in the register for video and control data;

when the virtual camera module receives a real-time video request, writing the real-time video request into the register for video and control data utilizing the virtual camera module and starting to repeatedly access the register for video and control data utilizing the virtual camera module to determine if there is a real-time video stream stored in the register for video and control data;

in response to determination that there is the real-time video request which is taken as an instruction related to the wireless video input device, stored in the register for video and control data, obtaining the real-time video request from the register for video and control data utilizing the data management module;

when the data management module obtains the real-time video request from the register for video and control data during accessing of the same, driving the wireless video input device to film a real-time video stream utilizing the data management module and driving the wireless video input device to transmit the real-time video stream to the data management module through a wireless data transmission interface utilizing the data management module;

writing the received real-time video stream into the register for video and control data utilizing the data management module;

in response to determination that there is the received real-time video stream stored in the register for video and control data, obtaining the received real-time video stream from the register for video and control data utilizing the virtual camera module; and when the virtual camera module obtains the received real-time video stream from the register for video and control data during accessing of the same, transmitting the real-time video stream to the application program module utilizing the virtual camera module.

7. The real-time video transmission method of claim 6 further comprising:

when the virtual camera module receives a supported-format request, writing the supported-format request into the register for video and control data and accessing the register for video and control data repeatedly utilizing the virtual camera module;

when the data management module obtains the supported-format request from the register for video and control data during accessing of the same, obtaining supported format information of the wireless video input device to write into the register for video and control data utilizing the data management module;

when the virtual camera module obtains the supported format information from the register for video and control data during accessing of the same, transmitting the supported format information to the application program module utilizing the virtual camera module; and setting a requested video format of the real-time video request according to the supported format information.

8. The real-time video transmission method of claim 6, wherein the computer further comprises a virtual audio-device module and a register for audio and control data, and the real-time video transmission method further comprises:

when the data management module receives a real-time audio stream generated by the wireless video input device from the wireless video input device, outputting the real-time audio stream to the register for audio and control data utilizing the data management module; and outputting the real-time audio stream stored in the register for audio and control data to the application program module utilizing the virtual audio device module.

9. The real-time video transmission method of claim 6, wherein the application program module executes an IM program, and the real-time video transmission method further comprises:

forwarding the real-time video stream through the IM program.

10. The real-time video transmission method of claim 6, wherein the virtual camera module is implemented under a user mode or a kernel mode of an OS executed by the computer.

11. The real-time video transmission method of claim 10, wherein if the virtual camera module is implemented under the kernel mode, the data management module writes the real-time video stream into the register or video and control data utilizing a pipeline method or a file mapping method.

12. The real-time video transmission method of claim 10, wherein if the virtual camera module is implemented under the user mode, the data management module writes the real-time video stream into the register for video and control data utilizing a dynamic-link library (DLL).

* * * * *